United States Patent
Park

(10) Patent No.: US 10,523,774 B2
(45) Date of Patent: Dec. 31, 2019

(54) METHOD AND SYSTEM FOR PERSONALIZING NOTIFICATION TIME WITHIN CONTENTS SERVICE

(71) Applicant: NAVER Corporation, Seongnam-si (KR)

(72) Inventor: Jieun Park, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 213 days.

(21) Appl. No.: 15/429,958

(22) Filed: Feb. 10, 2017

(65) Prior Publication Data

US 2017/0237821 A1 Aug. 17, 2017

(30) Foreign Application Priority Data

Feb. 16, 2016 (KR) .................. 10-2016-0017895

(51) Int. Cl.
G06F 15/16 (2006.01)
H04L 29/08 (2006.01)
H04L 12/26 (2006.01)

(52) U.S. Cl.
CPC .............. *H04L 67/26* (2013.01); *H04L 67/22* (2013.01); *H04L 67/325* (2013.01); *H04L 67/327* (2013.01); *H04L 29/08972* (2013.01); *H04L 43/0876* (2013.01)

(58) Field of Classification Search
CPC ..... H04L 67/26; H04L 67/325; H04L 67/327; H04L 67/22; H04L 29/08972; H04L 43/0876

See application file for complete search history.

(56) References Cited

U.S. PATENT DOCUMENTS

2014/0189111 A1* 7/2014 Ahola ................ H04L 67/22
709/224

FOREIGN PATENT DOCUMENTS

| JP | 2004199667 A | 7/2004 |
| JP | 2009060631 A | 3/2009 |
| JP | 2010157074 A | 7/2010 |
| JP | 2011014022 A | 1/2011 |
| KR | 2014-0109565 A | 9/2014 |

OTHER PUBLICATIONS

Japanese Office Action dated Jan. 9, 2018 by the Japanese Patent Office corresponding to Japanese patent application No. 2017-11010.

* cited by examiner

*Primary Examiner* — Padma Mundur
(74) *Attorney, Agent, or Firm* — Greer Burns & Crain Ltd.

(57) ABSTRACT

A push notification providing method performed by a computer includes managing, for each unit period, a user use time at which a user consumes content; analyzing a pattern associated with the user use time with respect to the unit period and selecting a personal notification time that is personalized for the user for the unit period based on the pattern; and sending a push notification associated with the content to an electronic device of the user at the selected personal notification time of the unit period corresponding to a point in time at which the push notification is to be sent.

4 Claims, 11 Drawing Sheets

METHOD AND SYSTEM FOR PERSONALIZING NOTIFICATION TIME WITHIN CONTENTS SERVICE

CROSS-REFERENCE TO RELATED APPLICATION(S)

This application claims priority under 35 U.S.C. § 119 to Korean Patent Application No. 10-2016-0017895 filed on Feb. 16, 2016, in the Korean Intellectual Property Office (KIPO), the entire contents of which are incorporated herein by reference.

BACKGROUND

Field

One or more example embodiments of the present invention relate to technology for providing a push notification associated with content.

Description of Related Art

A rapid increase in the number of users of ultra high speed communication networks has enabled the development of new services and diversification of service items through a communication network.

A demand from mobile device users is on the increase in association with a function of a mobile device, an access scheme to data from the mobile device, and the like.

Dynamic content delivery enables information or data to be automatically pushed to a user rather than data being directly retrieved and consumed by the user. Examples of data may include a new webtoon, stock price, latest weather information, latest traffic information, a dynamic wallpaper, an advertisement, an application, and/or other desirable information for the user.

For example, technology for providing a push notification service with respect to information designated by a user is disclosed in Korean Patent Publication No. 10-2014-0109565 published on Sep. 16, 2014.

SUMMARY

One or more example embodiments provide a method and system that may provide a personalized push notification by analyzing a user use record associated with content.

One or more example embodiments also provide a method and system that may optimize a notification time associated with content based on a user use pattern.

According to an aspect of at least one example embodiment, a notification providing method performed by a computer includes managing, for each unit period, a user use time that is a time at which a user consumes content; analyzing a pattern associated with the user use time with respect to each unit period, and selecting a personal notification time that is personalized for the unit period; and sending a notification associated with the content to an electronic device of the user at a personal notification time of a unit period corresponding to a point in time at which the notification is to be sent.

The unit period may be determined based on an update cycle of the content, the personal notification time selected for the unit period may be set as a notification delivery time of the corresponding unit period, and the notification to be sent during the unit period is sent at the notification delivery time during the corresponding unit period.

The selecting may include dividing the unit period into a plurality of block units, matching data in which the user use time is recorded to a block unit of a corresponding time span, and selecting the personal notification time of the corresponding unit period using a block unit to which at least one piece of data is matched among the plurality of block units.

The selecting may include dividing the unit period into a plurality of block units and matching data in which the user use time is recorded to a block unit of a corresponding time span; and selecting a start point of a block to which a largest number of pieces of data are matched among the plurality of block units as the personal notification time of the corresponding unit period.

The selecting may include dividing the unit period into a plurality of block units and matching data in which the user use time is recorded to a block unit of a corresponding time span; identifying a valid block that is a block unit to which at least one piece of data is matched from among the plurality of block units; determining whether a plurality of specific blocks each including at least a set number of pieces of data is present among valid blocks; and selecting a start point of the specific block as the personal notification time of the corresponding unit period in response to the presence of a single specific block.

The selecting may further include selecting a start point of a block that includes a largest number of pieces of data among the plurality of specific blocks as the personal notification time of the corresponding unit period in response to the presence of the plurality of specific blocks.

The selecting may further include selecting a start point of a block corresponding to an earliest time span among the plurality of specific blocks as the personal notification time of the corresponding unit period in response to the presence of the plurality of specific blocks.

The selecting may further include determining whether the same number of pieces of data are included in each of the specific blocks in response to the presence of the plurality of specific blocks; selecting a start point of a block that includes a largest number of pieces of data among the plurality of specific blocks as the personal notification time of the corresponding unit period in response to a different number of pieces of data being included in each of the specific blocks; and selecting a start point of a block corresponding to an earliest time span among the plurality of specific blocks as the personal notification time of the corresponding unit period in response to the same number of pieces of data being included in each of the specific blocks.

The selecting may further include processing adjacent blocks as a single block unit in response to the presence of the adjacent blocks within a set time among the valid blocks.

The selecting may further include processing, as a single block unit, adjacent blocks within a set time among the valid blocks in response to the absence of the specific block among the valid blocks.

The selecting may further include selecting a start point of a block corresponding to an earliest time span among the valid blocks as the personal notification time of the corresponding unit period in response to the absence of the specific block among the valid blocks.

The selecting may further include selecting the personal notification time of the corresponding unit period based on a specific cluster that includes at least a set number of pieces of data by clustering the user use time of the unit period, or selecting an earliest time in a cluster that includes a largest number of pieces of data as the personal notification time of the corresponding unit period.

According to another aspect of at least one example embodiment, there is provided a non-transitory computer-readable medium storing a program to implement a notification providing method. The notification providing method includes managing, for each unit period, a user use time that is a time at which a user consumes content; analyzing a pattern associated with the user use time with respect to each unit period, and selecting a personal notification time that is personalized for the unit period; and sending a notification associated with the content to an electronic device of the user at a personal notification time of a unit period corresponding to a point in time at which the notification is to be sent.

According to another aspect of at least one example embodiment, there is provided a notification providing system configured as a computer, the system including a manager configured to manage, for each unit period, a user use time that is a time at which a user consumes content; a selector configured to analyze a pattern associated with the user use time with respect to each unit period and to select a personal notification time that is personalized for the unit period; and a notification sender configured to send a notification associated with the content to an electronic device of the user at a personal notification time of a unit period corresponding to a point in time at which the notification is to be sent.

The selector may be further configured to divide the unit period into a plurality of block units and to match data in which the user use time is recorded to a block unit of a corresponding time span, and to select a start point of a block to which a largest number of pieces of data are matched among the plurality of block units as the personal notification time of the corresponding unit period.

The selector may be further configured to divide the unit period into a plurality of block units and to match data in which the user use time is recorded to a block unit of a corresponding time span, and to select a start point of a specific block that includes at least a set number of pieces of data among the plurality of block units as the personal notification time of the corresponding unit period.

The selector may be further configured to select a start point of a block that includes a largest number of pieces of data among the plurality of specific blocks as the personal notification time of the corresponding unit period in response to the presence of the plurality of specific blocks.

The selector may be further configured to select a start point of a block corresponding to an earliest time span among the plurality of specific blocks as the personal notification time of the corresponding unit period in response to the presence of the plurality of specific blocks.

The selector may be further configured to select a start point of a block corresponding to an earliest time span among the valid blocks as the personal notification time of the corresponding unit period in response to the absence of the specific block among the valid blocks.

The selector may be further configured to process, as a single block unit, adjacent blocks within a set time among block units to which at least one piece of data is matched among the plurality of block units.

According to some example embodiments, it is possible to enhance user accessibility and convenience associated with content and to reduce resources or processing cost used for providing content by analyzing a user use record of the content and by automatically providing the content desired by the user through a personalized push notification.

Also, according to some example embodiments, it is possible to personalize and optimize a notification delivery time and to effectively provide a content notification by recording a use time history of a user consuming contents, by recognizing a pattern frequently used by the user, and by providing the content notification based on the recognized user pattern.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
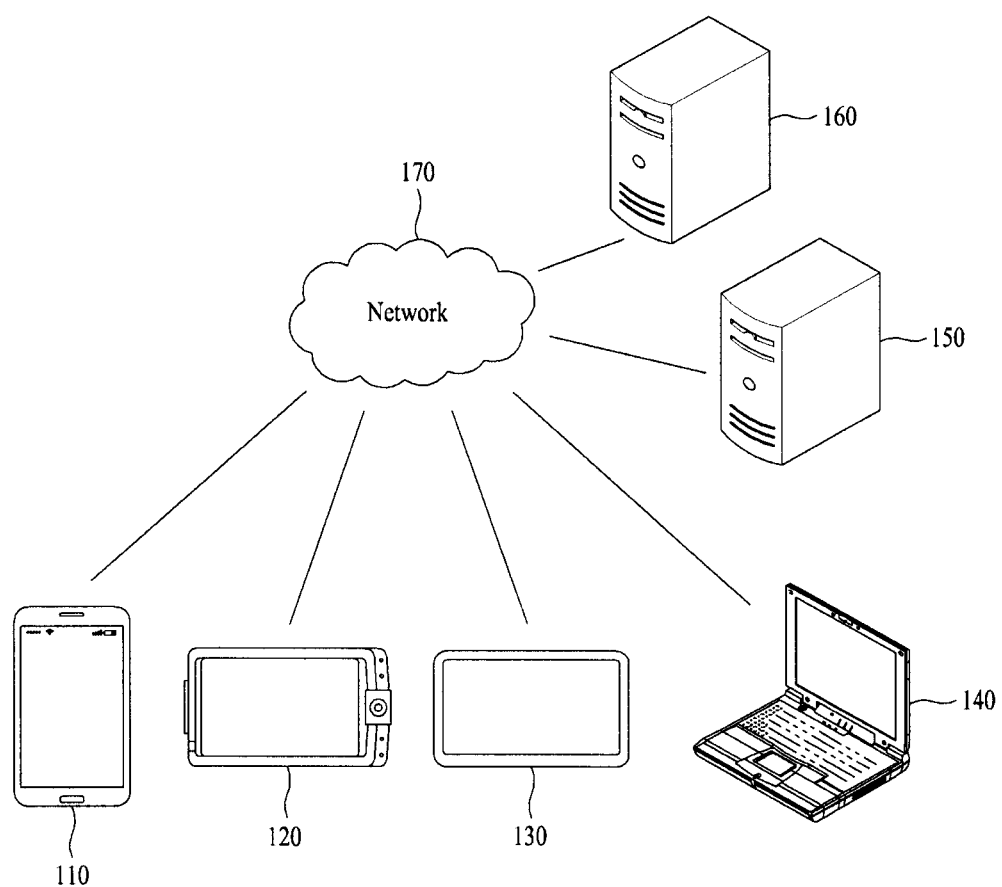
FIG. 1 is a diagram illustrating an example of a network environment for providing a notification according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for providing digital formatted content through the Internet, and more particularly, to technology for providing a push notification for connecting to content.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, the number of electronic devices and/or the number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a personal computer (PC), a laptop computer, a smartphone, a tablet, a wearable computer, navigation, a digital broadcasting terminal, a personal digital assistant (PDA), a portable multimedia player (PMP), and the like. For example, the electronic device 110 may communicate with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network, for example, a mobile communication network, the wired Internet, the wireless Internet, and a broadcasting network, which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and/or 140 over the network 170. Examples of the server computers 150 and 160 may include a server computing device, a PC, series of server computers, a mini computer, and/or a main frame computer, but, are not limited thereto. The server computers 150 and 160 may each be a distributive system, and operations of the server computers may be executed simultaneously and/or sequentially on one or more processors.

For example, the server 150 serves as a content service platform that provides digital formatted content, for example, a webtoon, etc., to the electronic device 110 that is a client. In particular, the server 150 may provide a push notification associated with a personalized pattern by analyzing a user use record within a content service.

As another example, the server 160 may provide a file for installing an application to the electronic device 110 connected over the network 170. In this case, the electronic device 110 may install the application using the file provided from the server 160.

The server 160 may connect to the server 150 under control of at least one program, for example, a browser or the installed application, and an operating system (OS) included in the electronic device 110, and may use a service or content provided from the server 150. For example, in response to a service request message transmitted from the electronic device 110 to the server 150 over the network 170 under control of the application, the server 150 may transmit a code corresponding to the service request message to the electronic device 110, and the electronic device 110 may provide content to the user by configuring and displaying a screen corresponding to the code under control of the application.

Figure 2:
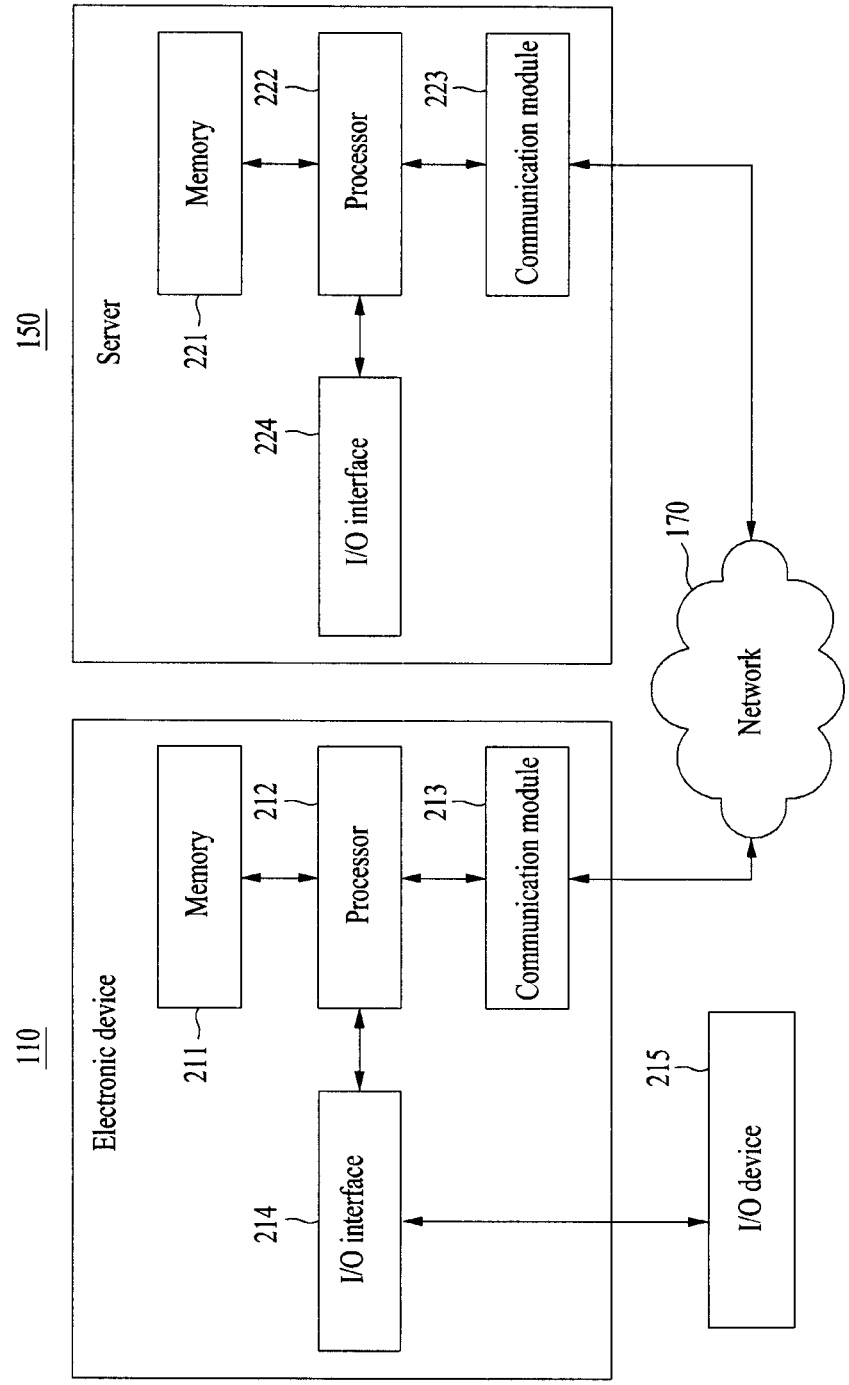
FIG. 2 is a block diagram illustrating an example of a configuration of an electronic device and a server for providing a notification according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar constituent elements may be applicable to other electronic devices 120, 130, and/or 140, or the server 160, and also to still other electronic devices or still other servers.

Referring to FIG. 2, the electronic device 110 includes a memory 211, a processor 212, a communication module 213, and an input/output (I/O) interface 214, and the server 150 includes a memory 221, a processor 222, a communication module 223, and an I/O interface 224. The memories 211, 221 may include a permanent mass storage device, such as random access memory (RAM), read only memory (ROM), a disk drive, etc., as a computer-readable storage medium. Also, an OS and at least one program code, for example, the aforementioned code for browser or the application installed and executed on the electronic device 110, may be stored in the memories 211, 221. Such software constituent elements may be loaded from another computer-readable storage medium separate from the memories 211, 221 using a drive mechanism. The other computer-readable storage media may include, for example, a floppy drive, a disk, a tape, a DVD/CD-ROM drive, a memory card, etc. According to other example embodiments, software constituent elements may be loaded to the memories 211, 221 through the communication modules 213, 223, instead of, or in addition to, the computer-readable storage medium. For example, at least one program may be loaded to the memories 211, 221 based on a program, for example, the application, installed by files provided over the network 170 from developers or a file distribution system, for example, the server 160, which provides an installation file of the application.

The processors 212, 222 may be configured to process computer-readable instructions, for example, the aforementioned at least one program code, of a computer program by performing basic arithmetic operations, logic operations, and I/O operations. The computer-readable instructions may be provided from the memories 211, 221 and/or the communication modules 213, 223 to the processors 212, 222. For example, the processors 212, 222 may be configured to execute received instructions in response to the program code stored in the storage device, such as the memories 211, 222.

The communication modules 213, 223 provide a function for communication between the electronic device 110 and the server 150 over the network 170, and provide a function for communication with another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interface 214 is a device used for interface with an I/O device 215. For example, an input device may include a keyboard, a mouse, etc., and an output device may include a device, such as a display for displaying a communication session of an application. As another example, the I/O interface 214 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of constituent elements than the number of constituent elements shown in FIG. 2. However, there is no need to clearly illustrate many constituent elements according to the related art. For example, the electronic device 110 may include at least a portion of the I/O device 215, or may further include other constituent elements, for example, a transceiver, a global positioning system (GPS) module, a camera, a variety of sensors, a database, and the like.

Herein, the term 'content' includes a webtoon, a moving picture, a photo, an image, music, a document, and the like, and may inclusively indicate various types of information produced and distributed using a digital scheme or the content thereof.

Figure 3:
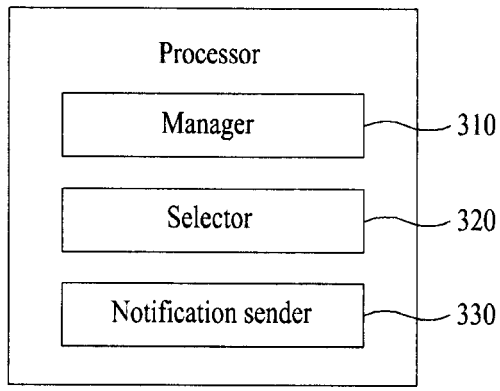
FIG. 3 is a diagram illustrating an example of constituent elements includable in a processor of a server for providing a notification according to at least one example embodiment.
Figure 4:
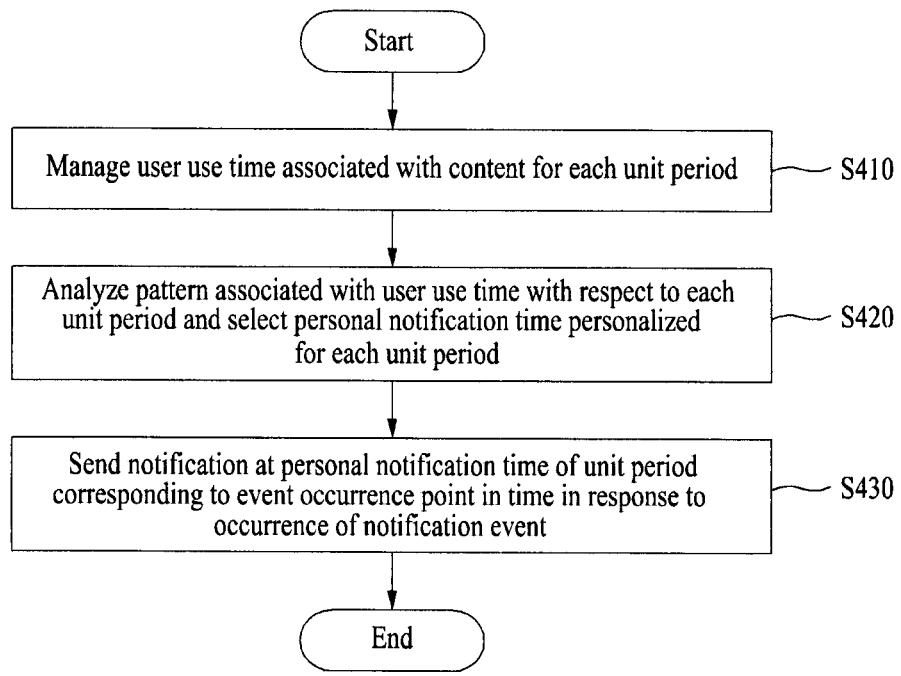
FIG. 4 is a flowchart illustrating an example of a notification providing method performed at a server according to at least one example embodiment.

FIG. 3 is a diagram illustrating an example of constituent elements includable in the processor 222 of the server 150 according to at least one example embodiment, and FIG. 4 is a flowchart illustrating an example of a method for providing a notification associated with content performed at the server 150 according to at least one example embodiment. Referring to FIG. 3, the processor 222 of the server 150 includes a manager 310, a selector 320, and a notification sender 330. These constituent units or elements 310, 320, 330 of the processor 222 control the server 150 to perform operations S410 through S430 of FIG. 4, and to this end, may be configured to execute a code of at least one program and an OS included in the memory 221.

In operation S410, the manager 310 manages a user use time associated with content for each unit period with respect to a user that uses a content service. The user use time refers to a time at which the user consumes the content and may indicate, for example, a time at which the user reads a webtoon. The unit period may be determined based on an update cycle of the content. For example, the manager 310 may record and manage times at which the user reads contents based on a day unit. For example, the manager 310 may store, on the server 150 as a database, and manage a user use time for each unit period with respect to each user. Here, the manager 310 may receive a user use record for each unit period from the electronic device 110. For example, the electronic device 110 may record a content consumption time of a user by locally checking an application launch time, and may provide record data about the user use time to the server 150 in response to a request of the server 150.

In operation S420, the selector 320 analyzes a pattern associated with a user use time of a corresponding unit period for each unit period, and selects a personal notification time personalized for each unit period. For example, a content consumption pattern of a user may vary for each day. Thus, the selector 320 may analyze times at which the user consumed contents on a corresponding day for each day, may retrieve a time span in which the user generally consumes corresponding content, and may select the retrieved time span as a personal notification time of the corresponding day. For example, the selector 320 may divide a unit period into a plurality of block units, for example, may divide a day based on a block unit of 15 minutes, may verify a block unit corresponding to a time span in which the user generally consumes contents among the plurality of block units, and may select a start point of the block unit as a personal notification time. As another example, the selector 320 may retrieve a cluster that includes a largest number of pieces of data by clustering a user use time of a unit period, and may set the earliest time in data of the retrieved cluster as the personal notification time of the corresponding unit period. For example, the selector 320 may analyze a user pattern by clustering the user use time using a cluster algorithm, for example, a mean-shift algorithm, a K-means algorithm, etc.

In operation S430, the notification sender 330 sends a push notification associated with the content to the user. Here, in response to occurrence of a notification event associated with the content, the notification sender 330 may send a corresponding notification at a personal notification time of a unit period corresponding to an event occurrence point in time among personal notification times for the respective unit times selected in operation S420. The notification may be sent in a message format that includes a path capable of directly connecting the user to the content. In response to the occurrence of the notification event associated with the content, the notification sender 330 may send a notification message at a personal notification time of a unit period corresponding to a point in time at which the notification event has occurred. For example, the notification sender 330 may periodically provide a new work notification associated with newly registered content. Here, the notification sender 330 may send the new work notification by applying a personal notification time of a unit period corresponding to a notification cycle as a notification delivery time. As another example, if the user has no content use record during at least a determined (or, alternatively, desired) period, for example, two weeks or more, the notification sender 330 may provide a long-term non-access notification. Here, the notification sender 330 may send the long-term non-access notification by applying a personal notification time of a unit period corresponding to a notification providing point in time as a notification delivery time. Accordingly, when providing a notification associated with content, the notification sender 330 may send the notification to the user at a personalized notification delivery time.

Figure 5:
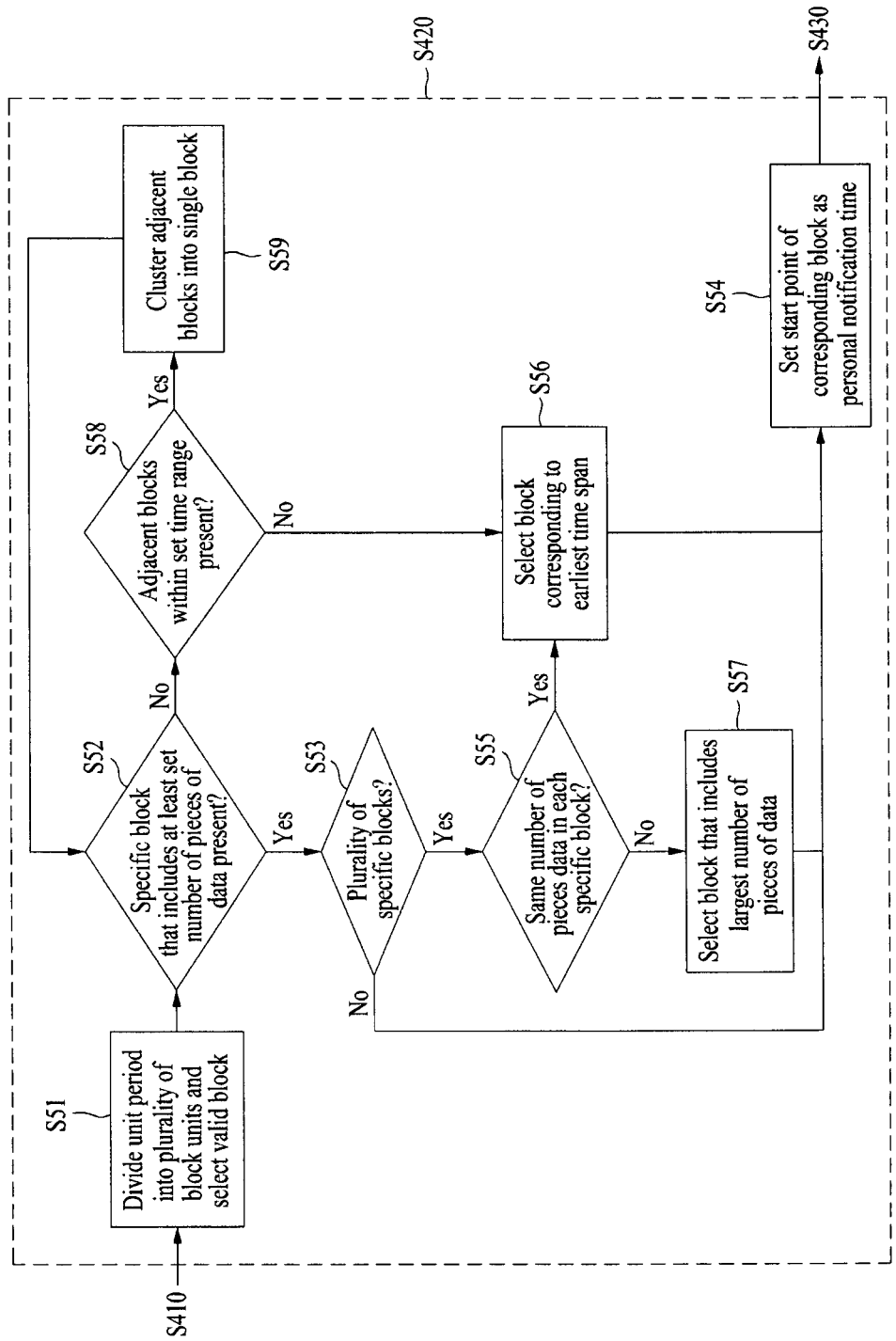
FIG. 5 is a flowchart illustrating an example of selecting a personal notification time according to at least one example embodiment.

FIG. 5 is a flowchart illustrating an example of a method of selecting a personal notification time according to at least one example embodiment. The personal notification time selecting method of FIG. 5 corresponds to operation S420 of FIG. 4 and each of operations included in the personal notification time selecting method may be performed at the selector 320 of FIG. 3. The operations included in the personal notification time selecting method may not necessarily be performed in the illustrated order. Further, a portion of the operations may be omitted or an additional process may be further included.

The personal notification time selecting method may be performed sequentially or in parallel with respect to each unit period.

In operation S51, the selector S51 divides a unit period into a plurality of block units, and identifies a valid block that includes at least one piece of data in which a user use time is recorded from among the plurality of block units. Here, the block unit may be determined based on a one-time average use time of service users. The block unit may be set to be different for each region or each user. For example, the unit period may correspond to each day and, if the unit period is a day, the unit period may be divided into 96 block units, such as 00:00:00~00:14:59, 00:15:00~00:29:59, . . . , based on a unit of 15 minutes. The selector 320 may match data in which the user use time associated with the content is recorded to a block unit of a corresponding time span, and may select a block unit to which at least one piece of data is matched as a valid block. Here, the selector 320 may use a user use time for each unit period of a recent predetermined period in order to set a personal notification time for each unit period. In the case of setting a personal notification time of Monday, the selector 320 may use a user use time recorded every Monday over recent three weeks.

In operation S52, the selector 320 determines whether a specific block that includes at least a set number of pieces of data is present among valid blocks. For example, the selector 320 may select a block of a time span in which at least two pieces of data, that is, at least two user use records, are present.

If the specific block is determined to be present in operation S52, the selector 320 determines whether a plurality of specific blocks is present in operation S53.

If not a plurality of specific blocks but a single specific block is determined to be present among the valid blocks in operation S53, the selector 320 sets a start point of a block unit corresponding to the single specific block as the personal notification time of the corresponding unit period in operation S54.

If the plurality of specific blocks is determined to be present among the valid blocks in operation S53, the selector 320 determines whether a number of pieces of data matched to each specific block is the same in operation S55.

If the number of pieces of data matched to each specific block is determined to be the same in operation S55, the selector 320 selects a block corresponding to the earliest time span from among the plurality of specific blocks in operation S56. The selector 320 sets a start point of a block unit corresponding to the specific block selected in operation S56 as the personal notification time of the corresponding unit period.

If the number of pieces of data matched to each specific block is determined to be different in operation S55, the selector 320 selects a block that includes at least a largest number of pieces of data from among the plurality of specific blocks in operation S57. The selector 320 then sets a start point of a block unit corresponding to the selected block as the personal notification time of the corresponding unit period in operation S54.

If the specific block that includes at least a set number of pieces of data is determined to be absent in operation S52, the selector 320 determines whether adjacent blocks within a set time range are present among the valid blocks in operation S58. For example, the selector 320 may select adjacent blocks within ±15 minutes from among the valid blocks.

If the adjacent blocks within the set time range are determined to be present among the valid blocks in operation S58, the selector 320 processes the adjacent blocks into a single block unit through clustering in operation S59. The selector 320 may regard the adjacent blocks among the valid blocks as the same blocks and may iterate the above process of operation S52 through S58 with respect to the clustered block unit.

If the adjacent blocks within the set time range are determined to be absent among the valid blocks in operation S58, the selector 320 selects a block corresponding to the earliest time span from among the valid blocks in operation S56 and sets a start point of a block unit corresponding to the selected block as the personal notification time of the corresponding unit period in operation S54. If a time event closest to the time at which the notification event has occurred is absent, the selector 320 may set the personal notification time of the corresponding unit period as 00 (h):00 (m):00 (s).

FIGS. 6 through 11 illustrate examples of setting a personal notification time for each user pattern according to at least one example embodiment.

Hereinafter, it is assumed that a notification trigger has occurred at 00 (hour):00 (minute):00 (second) of Monday. Here, a user use time recorded every Monday over the recent three weeks is used to analyze a user pattern. For example, the user pattern may be analyzed by dividing a day into 96 block units, for example, 00:00:00~00:14:59, 00:15:00~00:29:59, . . . , based on a unit of 15 minutes, and by matching data in which a user use time associated with content is recorded to a block unit of a corresponding time span.

Figure 6:
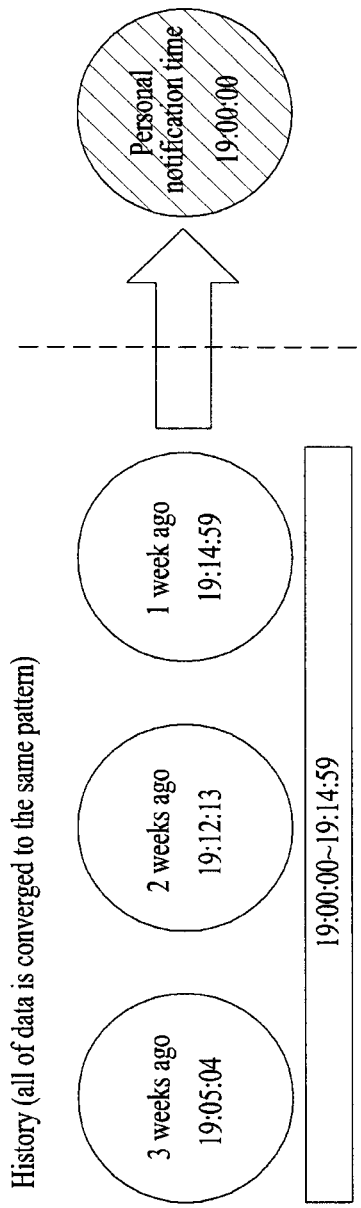
FIGS. 6 through 12 illustrate examples of setting a personal notification time for each user pattern according to at least one example embodiment.

Referring to FIG. 6, in an example in which all of the data recorded for the same unit period (Monday) as a notification trigger occurrence point in time over the recent three weeks is converged to a block unit of the same time span, for example, a block of 19:00:00~19:14:59, the personal notification time of Monday is selected as "19:00:00" that is a start point of the corresponding block.

Figure 7:
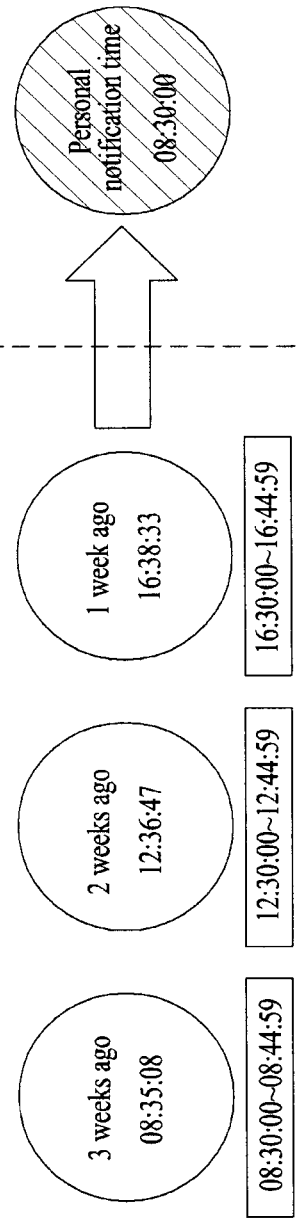

Dissimilar to the user pattern of FIG. 6, FIG. 7 illustrates an example in which all of the data recorded for the same unit period (Monday) as a notification trigger occurrence point in time over the recent three weeks is distributed in different time spans. Referring to the user pattern of FIG. 7, a user pattern appears in a block of 08:30:00~08:44:59 three weeks ago, in a block of 12:30:00~12:44:59 two weeks ago, and in a block of 16:30:00~16:44:59 one week ago. If all of the access times exhibit different patterns and block units are not adjacent to each other, the personal notification time of the corresponding unit period is selected as a start point of a block corresponding to the earliest time, that is, "08:30:00" of 08:30:00~08:44:59, among the blocks in which at least one user use record is present.

Figure 8:
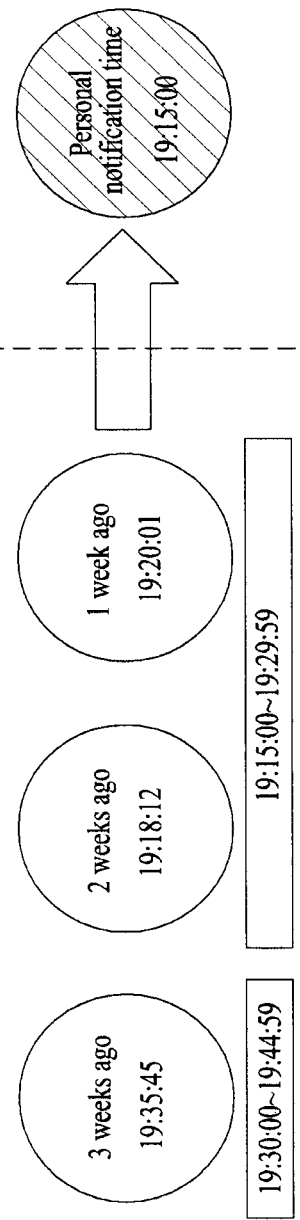

FIG. 8 illustrates an example in which a user pattern appears in a single block unit twice or more. Referring to FIG. 8, for example, a user pattern appears in a block of 19:30:00~19:44:59 three weeks ago and appears in a block of 19:15:00~19:29:59 two weeks ago and one week ago. In this example, the personal notification time of the unit period is selected as a start point of a block that includes a largest number of pieces of data, that is, "19:15:00" of 19:15: 00~19:29:59, among the blocks in which a user use record is present.

Figure 9:
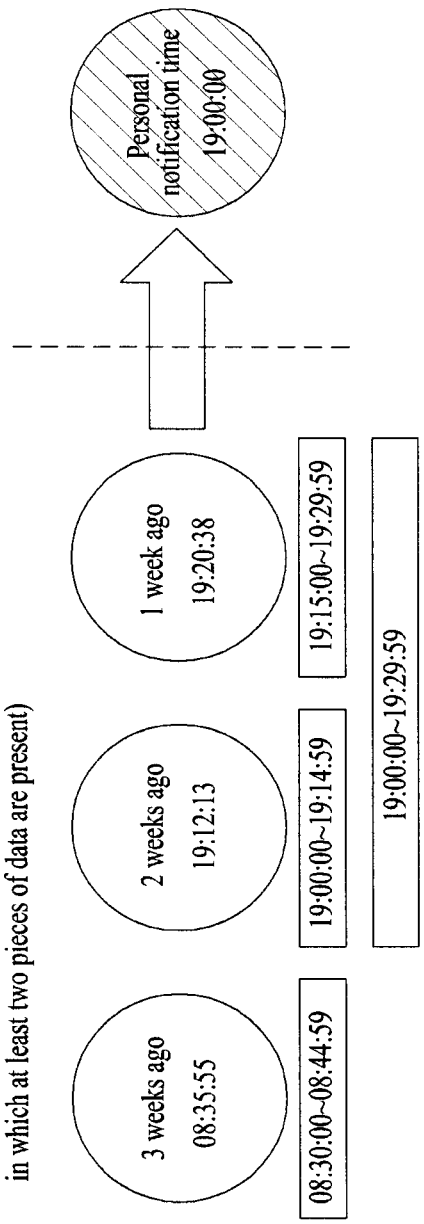

FIG. 9 illustrates an example in which adjacent blocks are present among blocks in which a user use record is present.

Referring to FIG. 9, for example, if a user pattern appears in a block of 08:30:00~08:44:59 three weeks ago, in a block of 19:00:00~19:14:59 two weeks ago, and in a block of 19:15: 00~19:29:59 one week ago, the block of 19:00:00~19:14:59 and the block of 19:15:00~19:29:59 are regarded as a single block unit. Accordingly, data of adjacent blocks among blocks in which a user use record is present may be clustered as data of the same block unit. Accordingly, a start point "19:00:00" of a corresponding block is selected as the personal notification time of Monday based on 19:00:00~19: 29:59 that is a block including a largest number of pieces of data between the block of 08:30:00~08:44:59 and the block of 19:00:00~19:29:59.

Figure 10:
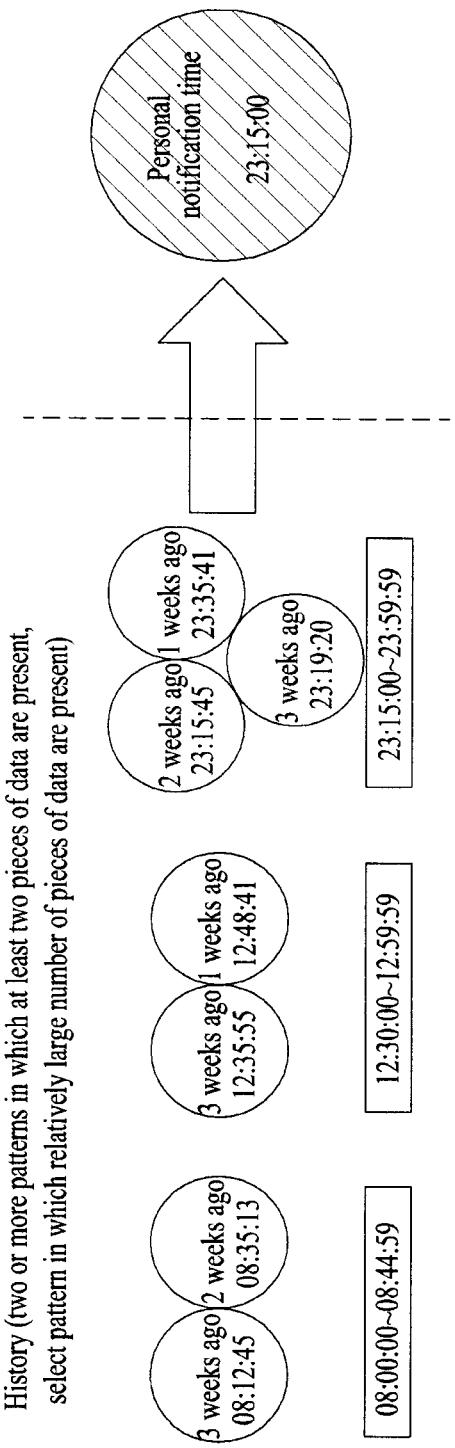
Figure 11:
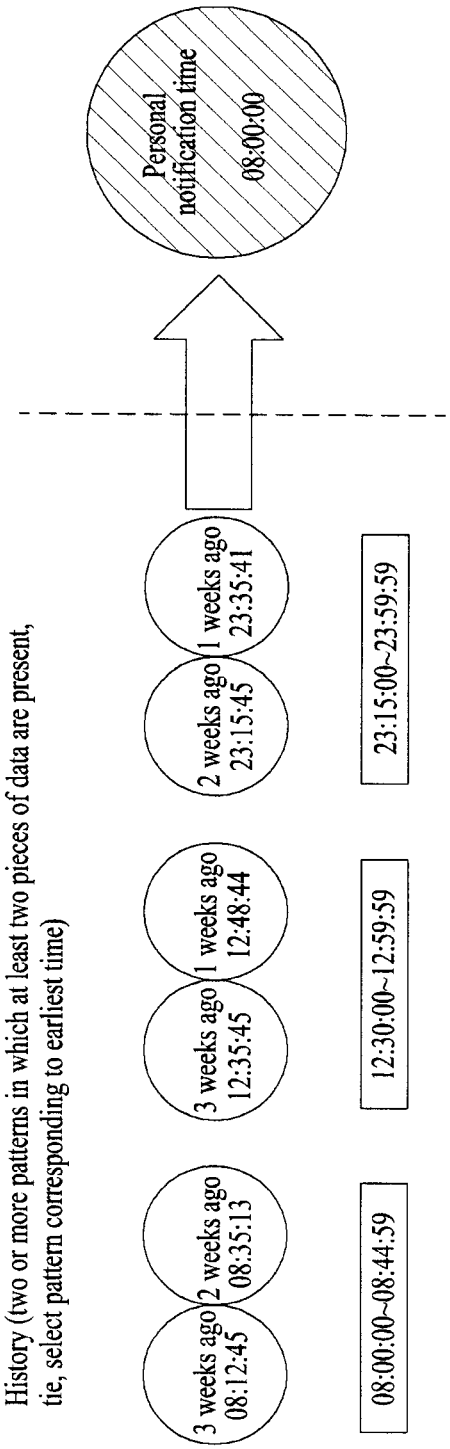

FIGS. 10 and 11 illustrate an example in which at least two user use records are present in a plurality of blocks through clustering of adjacent blocks.

Referring to FIG. 10, in an example in which a user use time recorded every Monday over the recent three weeks appears twice in a block of 08:00:00~08:44:59, twice in a block of 12:30:00~12:59:59, and three times in a block of 23:15:00~23:59:59, a start point "23:15:00" of a corresponding block is selected as the personal notification time of Monday based on 23:15:00~23:59:59 that is a block including a largest number of pieces of clustered data.

Referring to FIG. 11, in an example in which a user use time recorded every Monday over the recent three weeks appears the same number of times, that is, twice in a block of 08:00:00~08:44:59, twice in a block of 12:30:00~12:59: 59, and twice in a block of 23:15:00~23:59:59, a start point of "08:00:00" of a corresponding block is selected as the personal notification time of Monday based on 08:00:00~08: 14:59 that is a block corresponding to the earliest time.

As described above, the selector 320 may express a personal use pattern of a user that consumes contents using a block and may select a time frequently used by the user as a personal notification time based on a number of pieces of data included in each block. Here, if the same number of pieces of data are included in each of the blocks in which a user pattern appears, the selector 320 may select a time closest to a notification event as the personal notification time.

Although an example embodiment of dividing a unit period into a plurality of blocks and selecting, as a personal notification time, a start point of a block that includes a relatively large number of user use records is described, it is provided as an example only. Instead of dividing the unit period based on a block unit, data in which a user use time is recorded may be clustered and be selected as the personal notification time.

Figure 12:
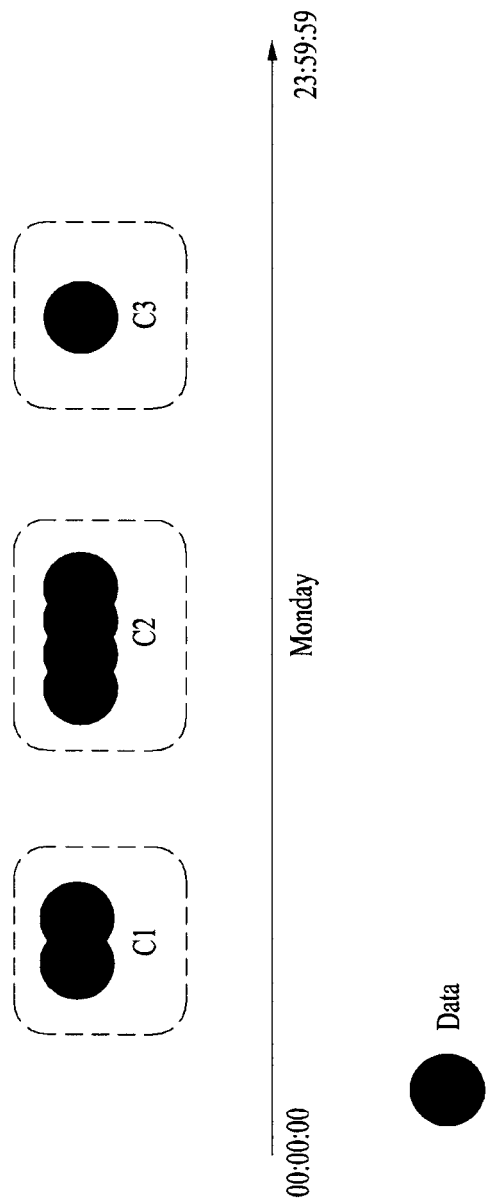

For example, referring to FIG. 12, data recorded every Monday over a recent predetermined (or, alternatively, desired) period may be clustered based on a time, and a cluster C2 that includes a largest number of pieces of data may be selected from among clusters C1, C2, and C3, and the earliest time in data included in the cluster C2 may be selected as the personal notification time of Monday. Likewise, if a plurality of clusters includes a largest number of pieces of data, or if the same number of pieces of data are included in each of the clusters, the personal notification time may be determined by selecting a cluster corresponding to the earliest time.

A method of directly clustering data in which a user use time is recorded may use a mean-shift algorithm, a K-means algorithm, etc.

A notification message sent from the server 150 may be displayed on a screen of the electronic device 110 under control of the application installed on the electronic device 110. In response to a user selection on the notification message, the user may connect to a detailed page of corresponding content along a path included in the notification message.

The server 150 may provide a user setting environment with respect to a personalized notification and may provide a push notification associated with content at a personal notification time set based on a recent use record of the user, based on a user setting.

According to example embodiments, it is possible to analyze a pattern associated with a time at which a user consumes content within a content service and to provide a notification at a time personalized and optimized for the user pattern.

Herein, it is described that the server 150 configured as a client-server environment provides a personalized notification by analyzing a user use record within a content service. However, it is provided as an example only and features associated with the example embodiments may be configured in an application form installed on the electronic device 110 so that the electronic device 110 may provide the personalized notification by analyzing the user use record directly.

According to some example embodiments, it is possible to enhance user accessibility and convenience associated with content and to reduce resources or processing cost used for providing content by analyzing a user use record of the content and by automatically providing the content desired by the user through a personalized push notification. Also, according to some example embodiments, it is possible to personalize and optimize a notification delivery time and to effectively provide a content notification by recording a use time history of a user consuming contents by recognizing a pattern frequently used by the user, and by providing the content notification based on the recognized user pattern.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A notification providing method performed by a computer for providing a push notification on an electronic device of a user, the method comprising:
    managing, for each unit period, a user use time at which a user consumes content;
    dividing the unit period into a plurality of block units and matching data in which the user use time is recorded to a block unit of a corresponding time span;
    identifying each of at least one valid block to which at least one piece of data is matched from among the plurality of block units;
    determining whether a plurality of specific blocks each including at least a set number of pieces of data is present among identified each of at least one valid block within a predetermined number of unit periods;
    selecting a start point of a specific block that includes a largest number of pieces of data among the plurality of specific blocks within a predetermined number of unit periods as the personal notification time of the corresponding unit period in response to the presence of the plurality of specific blocks; and
    sending a push notification associated with the content to the electronic device of the user at the selected personal notification time of the unit period corresponding to a point in time at which the push notification is to be sent,
    wherein in response to the presence of at least two specific blocks that include the largest number of pieces of data among the plurality of specific blocks within the predetermined number of unit periods, selecting a start point of a specific block corresponding to an earliest time span among the at least two specific blocks as the personal notification time of the corresponding unit period, and
    wherein adjacent valid block units each having at least one piece of data are regarded as a single block unit when selecting the start point of the specific block that includes a largest number of pieces of data among the plurality of specific blocks within a predetermined number of unit periods.

2. The method of claim 1, wherein the unit period is determined based on an update cycle of the content,
    the personal notification time selected for the unit period is set as a notification delivery time of the corresponding unit period, and
    the push notification sent during the unit period is sent at the notification delivery time during the corresponding unit period.

3. A non-transitory computer-readable medium storing a program to implement a notification providing method for providing a push notification on an electronic device of a user, wherein the notification providing method comprises:
    managing, for each unit period, a user use time at which a user consumes content;
    dividing the unit period into a plurality of block units and matching data in which the user use time is recorded to a block unit of a corresponding time span;
    identifying each of at least one valid block to which at least one piece of data is matched from among the plurality of block units;
    determining whether a plurality of specific blocks each including at least a set number of pieces of data is present among identified each of at least one valid block within a predetermined number of unit periods;
    selecting a start point of a specific block that includes a largest number of pieces of data among the plurality of specific blocks within a predetermined number of unit periods as the personal notification time of the corresponding unit period in response to the presence of the plurality of specific blocks; and
    sending a push notification associated with the content to the electronic device of the user at the selected personal notification time of the unit period corresponding to a point in time at which the push notification is to be sent,
    wherein in response to the presence of at least two specific blocks that include the largest number of pieces of data among the plurality of specific blocks within the predetermined number of unit periods, selecting a start point of a specific block corresponding to an earliest time span among the at least two specific blocks as the personal notification time of the corresponding unit period, and
    wherein adjacent valid block units each having at least one piece of data are regarded as a single block unit when selecting the start point of the specific block that includes a largest number of pieces of data among the plurality of specific blocks within a predetermined number of unit periods.

4. A notification providing system configured as a computer for providing a push notification on an electronic device of a user, the system comprising:

a processor including a plurality of functional units configured to execute a plurality of corresponding functions, functional units including,
a manager configured to manage, for each unit period, a user use time at which a user consumes content;
a selector configured to
divide the unit period into a plurality of block units and match data in which the user use time is recorded to a block unit of a corresponding time span;
identify each of at least one valid block to which at least one piece of data is matched from among the plurality of block units;
determine whether a plurality of specific blocks each including at least a set number of pieces of data is present among identified each of at least one valid block within a predetermined number of unit periods; and
select a start point of a specific block that includes a largest number of pieces of data among the plurality of specific blocks within a predetermined number of unit periods as the personal notification time of the corresponding unit period in response to the presence of the plurality of specific blocks; and
a notification sender configured to send a push notification associated with the content to the electronic device of the user at the selected personal notification time of the unit period corresponding to a point in time at which the push notification is to be sent,
wherein in response to the presence of at least two specific blocks that include the largest number of pieces of data among the plurality of specific blocks within the predetermined number of unit periods, the selector selects a start point of a specific block corresponding to an earliest time span among the at least two specific blocks as the personal notification time of the corresponding unit period, and
wherein adjacent valid block units each having at least one piece of data are regarded as a single block unit when selecting the start point of the specific block that includes a largest number of pieces of data among the plurality of specific blocks within a predetermined number of unit periods.

* * * * *